(12) United States Patent
Miller et al.

(10) Patent No.: US 11,190,489 B2
(45) Date of Patent: Nov. 30, 2021

(54) METHODS AND SYSTEMS FOR ESTABLISHING A CONNECTION BETWEEN A FIRST DEVICE AND A SECOND DEVICE ACROSS A SOFTWARE-DEFINED PERIMETER

(71) Applicant: OPSWAT, Inc., San Francisco, CA (US)

(72) Inventors: Russell Paul Miller, Tampa, FL (US); Travis Lowell Dimmig, Brandon, FL (US); Jeffrey Thomas Price, Brandon, FL (US); James David Robinson, Lakeland, FL (US)

(73) Assignee: OPSWAT, Inc., San Francisco, CA (US)

( * ) Notice: Subject to any disclaimer, the term of this patent is extended or adjusted under 35 U.S.C. 154(b) by 37 days.

(21) Appl. No.: 16/891,954

(22) Filed: Jun. 3, 2020

(65) Prior Publication Data
US 2020/0389437 A1 Dec. 10, 2020

Related U.S. Application Data

(60) Provisional application No. 62/857,090, filed on Jun. 4, 2019.

(51) Int. Cl.
*H04L 29/06* (2006.01)
*H04L 12/66* (2006.01)

(52) U.S. Cl.
CPC .......... *H04L 63/0245* (2013.01); *H04L 12/66* (2013.01); *H04L 63/0209* (2013.01);
(Continued)

(58) Field of Classification Search
CPC ............ H04L 63/0245; H04L 63/0209; H04L 63/0263; H04L 63/0823
See application file for complete search history.

(56) References Cited

U.S. PATENT DOCUMENTS 9,038,151 B1   5/2015   Chua et al.
9,942,274 B2   4/2018   Islam et al.
(Continued)

OTHER PUBLICATIONS

Bilger, et al., SDP Specification 1.0, Apr. 2014, 28 pgs, Cloud Security Alliance.
(Continued)

*Primary Examiner* — Vance M Little
(74) *Attorney, Agent, or Firm* — MLO, a professional corp.

(57) ABSTRACT

A method and system include a SDP controller in a SDP receiving a request from a first device for communicating with a second device. The second device is in the SDP. A firewall includes a connection table configured to map an identity of the first device and second device, and a filter table is configured to open and close ports. The SDP controller authenticates the first device, and provides the identity of the first device to the second device. The second device transmits a first packet to the first device. The firewall maps in the connection table, the identity of the first device in association with the second device. The first device transmits a second packet to the second device. The firewall determines that the identity of the first device is in the connection table for communicating with the second device and forwards the second packet to the second device.

20 Claims, 10 Drawing Sheets

(52) U.S. Cl.
CPC ........ *H04L 63/029* (2013.01); *H04L 63/0236* (2013.01); *H04L 63/0263* (2013.01); *H04L 63/0823* (2013.01); *H04L 63/166* (2013.01)

(56) References Cited

U.S. PATENT DOCUMENTS

| | | |
|---|---|---|
| 2002/0016826 A1 | 2/2002 | Johansson et al. |
| 2010/0205313 A1* | 8/2010 | Boire-Lavigne .... H04L 61/2564 709/228 |
| 2010/0228779 A1 | 9/2010 | Sim et al. |
| 2011/0299554 A1 | 12/2011 | Ros-Giralt et al. |
| 2014/0334481 A1 | 11/2014 | Boire-Lavigne et al. |
| 2016/0173444 A1 | 6/2016 | Nistor |
| 2016/0285828 A1* | 9/2016 | Keohane ............. H04L 63/0227 |
| 2016/0366184 A1* | 12/2016 | Luo .................... H04L 63/0227 |
| 2018/0063255 A1 | 3/2018 | Lu et al. |
| 2018/0176225 A1 | 6/2018 | Mizhar |
| 2019/0182213 A1* | 6/2019 | Saavedra ............ H04L 63/0218 |

OTHER PUBLICATIONS

Ford, Bryan, et al., Peer-to-Peer Communication Across Network Address Translators, May 10, 2019, 13 pgs, Bryan Ford.
Gianchandani, Prateek, Circumventing NAT with UDP hole punching, Feb. 21, 2012, 10 pgs, Infosec.
Rash, Michael, fwknop: Single Packet Authorization > Port Knocking, Feb. 6, 2010, 4 pgs, CipherDyne.
Rosenberg, et al., Session Traversal Utilities for NAT (STUN), Oct. 2008, 51 pgs, The IETF Trust.

* cited by examiner

METHODS AND SYSTEMS FOR ESTABLISHING A CONNECTION BETWEEN A FIRST DEVICE AND A SECOND DEVICE ACROSS A SOFTWARE-DEFINED PERIMETER

RELATED APPLICATIONS

This application claims priority to U.S. Provisional Patent Application No. 62/857,090 filed on Jun. 4, 2019 and entitled "Methods and Systems for Establishing a Network Connection Between a First Computing Device and a Second Computing Device Across a Software-Defined Perimeter," which is hereby incorporated by reference in full.

BACKGROUND

A Software Defined Perimeter (SDP) controls access to resources based on identity. Connectivity is based on a need-to-know model, in which device posture and identity are verified before access to the infrastructure is granted. The infrastructure is typically "black" meaning without visible information or internet protocol (IP) addresses. The SDP mitigates most common network-based attacks by unauthorized users.

Zero-trust is an information security framework which states that organizations should not trust any entity inside or outside of their perimeter at any time. Conventional approaches to zero-trust security typically adds latency, complexity, and cost by requiring one or more of an intermediate broker, an opened port, and/or a momentarily opened port. An intermediate broker conveys the traffic between the client and server system and introduces additional latency, bandwidth cost, and additional resource consumption. A port opened in a border-firewall to permit traffic from an external broker or gateway in through the border firewall increases the effort required for deployment, as the security and networking team need approval and do the work. More importantly, opening the port works against the zero-trust model and increases the risk of a network-based or malware attack. Momentary opening of a publicly reachable port on the SDP gateway to permit a network connection while routing traffic through the intermediate broker requires increased effort to deploy, increased latency, increased bandwidth usage, and decreased security.

SUMMARY

Some embodiments involve a method in which a software-defined perimeter (SDP) controller in a SDP, receives a request from a first device for communicating with a second device. The first device is in a first network and the second device is behind a firewall in a second network and in the SDP. The SDP controller does not allow devices outside the SDP to communicate with devices inside the SDP. The firewall includes a firewall connection table configured to map an identity of the first device and an identity of the second device for transmitting a plurality of packets between the first device and the second device, and a firewall filter table is configured to open and close ports of the firewall based on user inputs for the identity of the first device and the identity of the second device. The SDP controller authenticates the first device according to a SDP authentication protocol, and provides the identity of the first device to the second device. The second device transmits a first packet of the plurality of packets through the firewall and to the first device. The firewall in response to the transmitting of the first packet, maps in the firewall connection table, the identity of the first device in association with an identity of the second device to indicate that the first device is enabled for communicating with the second device. The first device transmits a second packet of the plurality of packets to the second device. The firewall determines that the identity of the first device is in the firewall connection table for communicating with the second device and forwards the second packet to the second device. The method establishes a secure connection for transmitting the plurality of packets directly between the first device and the second device while bypassing the firewall filter table in the firewall and without passing the plurality of packets through an intermediate broker.

Some embodiments involve a method in which a software-defined perimeter (SDP) controller in a SDP, receives a request from a first device for communicating with a second device. The first device is behind a first firewall is in a first network, and the second device is behind a firewall in a second network and in the software-defined perimeter. The SDP controller does not allow devices outside the SDP to communicate with devices inside the SDP. The first firewall includes a first firewall connection table configured to map an identity of the first device and an identity of the second device for transmitting a plurality of packets between the first device and the second device, and a first firewall filter table configured to open and close ports of the first firewall based on user inputs for the identity of the first device and the identity of the second device. The second firewall includes a second firewall connection table configured to map the identity of the first device and the identity of the second device for transmitting the plurality of packets between the first device and the second device, and a second firewall filter table configured to open and close ports of the second firewall based on user inputs of the identity of the first device and the identity of the second device. The SDP controller authenticates the first device according to a SDP authentication protocol, and initiates a hole punching protocol to detect the identity of the first device. The SDP controller provides the identity of the first device to the second device. The second device transmits a first packet of the plurality of packets through the second firewall and to the first device. The second firewall in response to the transmitting of the first packet, maps in the second firewall connection table, the identity of the first device in association with the identity of the second device to indicate that the first device is enabled for communicating with the second device. The SDP controller initiates the hole punching protocol to detect the identity of the second device, and provides the identity of the second device to the first device. The first device transmits a second packet of the plurality of packets to the second device. The first firewall, in response to the transmitting of the second packet, maps in the first firewall connection table, the identity of the second device in association with the identity of the first device to indicate that the second device is enabled for communicating with the first device. The method establishes a secure connection for transmitting the plurality of packets directly between the first device and the second device while bypassing the first firewall filter table in the first firewall and the second firewall filter table in the second firewall, and without passing the plurality of packets through an intermediate broker.

DETAILED DESCRIPTION

Figure 1A:
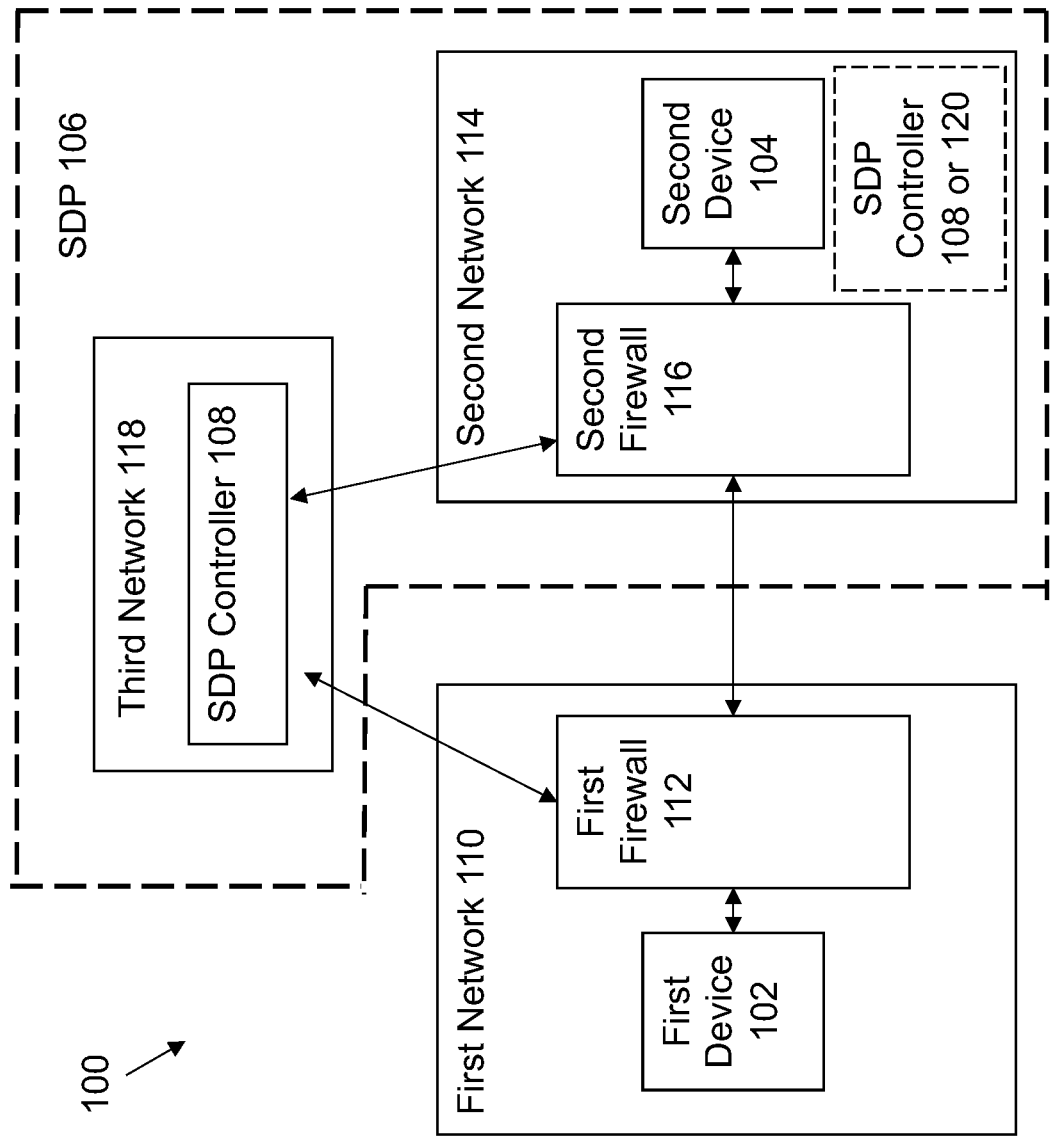
FIGS. 1A and 1B are simplified schematics of example systems, in accordance with some embodiments.

The present disclosure relates to methods and systems for establishing a secure network connection between a first device and a second device across a software-defined perimeter (SDP). The SDP involves the use of a standalone controller that performs the control functionality for a set of network devices. As an example of software defined networking, in the case of routing, rather than routers performing individual analyses to determine routes through the network, the controller can determine the routes and program other devices in the network to behave according to the determinations made by the controller. The SDP is a a trusted network for use by vetted clients.

The methods and systems described herein provide functionality for protecting application services from cyberattacks using a zero-trust approach for access to the SDP where the application traffic flows between the outside client and, for example, the server system within the SDP. After the client is authorized, the traffic flows directly between the client and the server gateway (albeit through conventional networking devices) without the need to open a firewall port and without flowing through an intermediate broker, such as a bastion, broker node, intermediate node or controller. In conventional approaches, the controller may act as the intermediate broker or a trust broker for the system, which checks context of traffic, grants entitlements and is a pathway for the traffic flow. When the intermediate broker is used, additional configuration is introduced, latency is increased and bandwidth may be decreased. The novel approach described herein conveys the traffic directly, without an intermediate broker after communication is established, and while doing so, tightens the security offered by the zero-trust, SDP model. In terms of reduced configuration, the lack of the intermediate broker makes the novel approach easier to deploy and less resource intensive. It is known in the art that opening firewall ports decreases the security of the system so the novel approach of the system and methods decrease the risk of malicious attacks and decreases the organizational friction involved in adopting such a solution.

The methods and systems described herein provide functionality that permits a direct connection between the client and server without an open inbound port and within the SDP environment. In some embodiments, the SDP environment, by definition, establishes a perimeter around certain computing devices and/or resources that leaves a first device inaccessible from a second device for security purposes (i.e., a deny-all firewall posture stance). Implementation of the methods and systems described herein allow for direct communication between the first device and the second device while minimizing the security risks involved with direct communications. This may be accomplished by the use of a firewall connection table which maps the identity of the client (or first) device in association with the identity of the server (or second) device to indicate that the client device is enabled for communicating with the server device within the SDP after discovering the identities by using a hole punching technique. This eliminates the need for opening ports in the firewall.

Figure 1B:
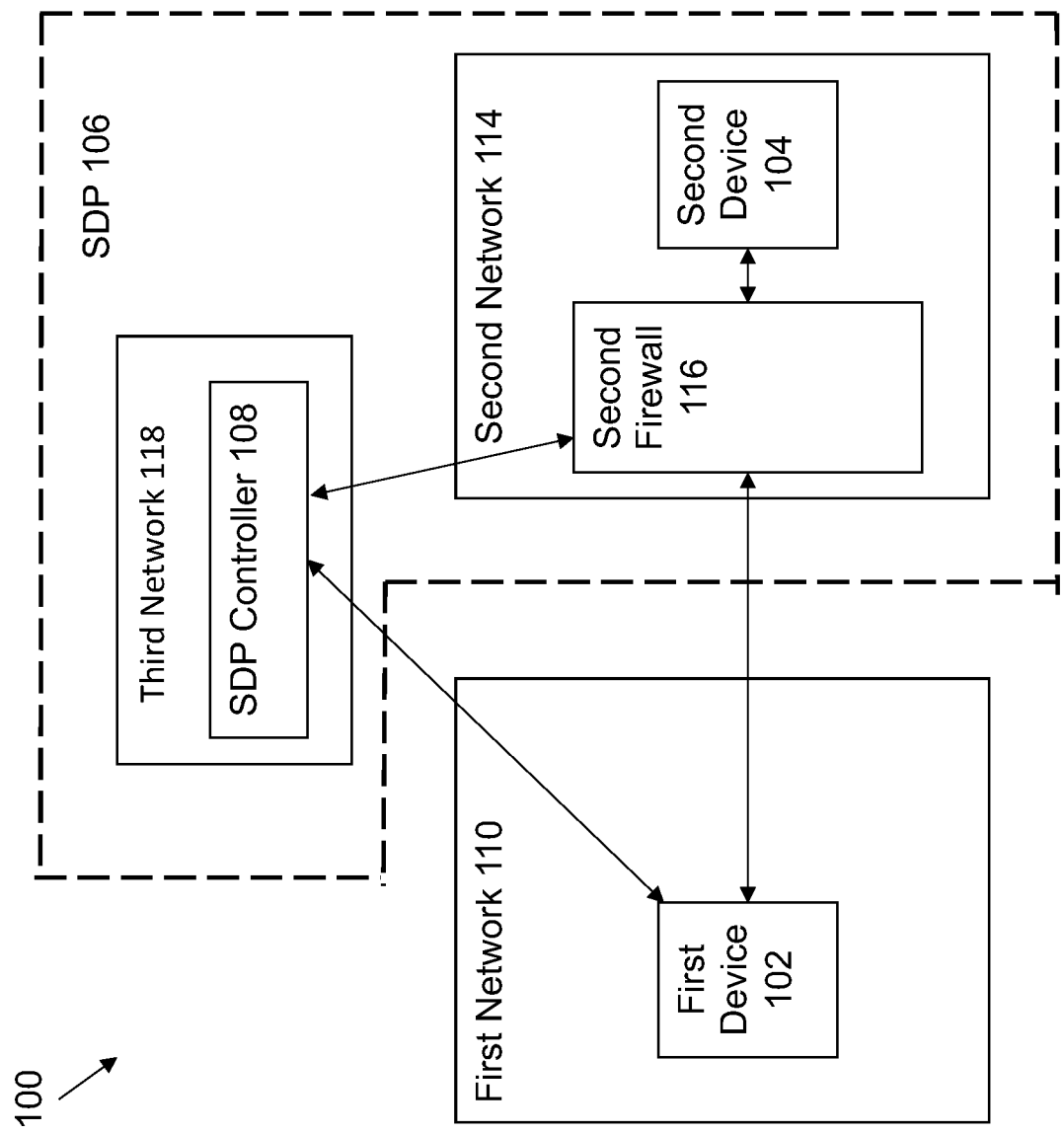

FIGS. 1A and 1B are simplified schematics of example systems, in accordance with some embodiments. Various embodiments of this disclosure may utilize the system 100. For example, methods may establish a network connection for communication between a first device 102 and a second device 104 across a SDP 106 (as indicated by broken lines in FIGS. 1A and 1B). In brief overview, the system 100 includes the first device 102, the second device 104, and a SDP controller 108. In some embodiments, the first device 102 is in a first network 110 and may be optionally behind a first firewall 112. FIG. 1A depicts the first device 102 behind the first firewall 112 and FIG. 1B depicts the first device 102 without a firewall. The second device 104 is in a second network 114 and behind a second firewall 116. The second device 104 may be a gateway such as the SDP application gateway. SDP controller 108 may be part of the second network 114 or another network such as a third network 118 within the SDP 106. The SDP includes at least the second device 104 and the SDP controller 108. The SDP controller 108 does not allow devices outside the SDP 106 to communicate with devices inside the SDP 106. As will be understood by those of ordinary skill in the art, the SDP 106 may include device authentication, identity-based access, and dynamically provisioned connectivity for devices outside of the SDP 106 to assist with mitigating network attacks on application infrastructure.

The first network 110 and the second network 114 can be a local area network (LAN), such as a company Intranet, a metropolitan area network (MAN), or a wide area network (WAN), such as the Internet or the World Wide Web. In some embodiments, there are multiple networks which may be private or public. For example, the first network 110 may be a public network when no firewall is present or a private network with a firewall. The second network 114 in the SDP 106 is a private network. The first network 110 and the second network 114 may be any type and/or form of network and may include a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the first network 110 and the second network 114 may comprise a wireless link, such as an infrared channel or satellite band. The topology of the networks may be a bus, star, or ring network topology. The first network 110 and the second network 114 may be of any such network topology as known to those ordinarily skilled in the art capable of supporting the operations described herein, and may comprise mobile telephone networks utilizing any protocol or protocols used to communicate among mobile devices (including tablets and handheld devices). In some embodiments, different types of data may be transmitted via different protocols. In other embodiments, the same types of data may be transmitted via different protocols.

The first device 102 and the second device 104 may be computing devices such as a workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations. The first device 102 and the second device 104 may execute, operate or otherwise provide an application, which can be any type and/or form of software, program, or executable instructions, including, without limitation, any type and/or form of web browser, web-based client, client-server application, or any other type and/or form of executable instructions capable of executing on the first device 102 and the second device 104. In some embodiments, the first device 102 and/or the second device 104 provide functionality of a web server.

In some embodiments, the first device 102 and/or the second device 104 may be a logical group of devices referred to as a server farm which may be administered as a single entity. In some embodiments, the first device 102 and the second device 104 are behind firewalls (e.g., the first firewall 112 and the second firewall 116, respectively), and it will be understood by those of ordinary skill in the art, that the embodiments apply similarly if only one of the devices is behind a firewall. Similarly, in some embodiments, either or both of the first device 102 and the second device 104 may be behind a plurality of networking devices including, without limitation, one or more firewalls.

As depicted in FIGS. 1A and 1B, the first device 102 executes within a first network 110, the second device 104 executes within a second network 114, and the SDP controller 108 executes on a third device in the third network 118. As will be understood by those of ordinary skill in the art, the first device 102 outside of the SDP 106 may execute on its own private network or on the public internet. Similarly, the SDP controller 108 may provide the functionality from within the third network 118 that is owned or maintained by an entity other than an entity that owns or maintains the second network 114. The SDP controller 108 may be referred to as being "in the cloud". Alternatively, the SDP controller 108 may provide the functionality from within the second network 114. For example, a device in the second network 114 may execute the functionality of the SDP controller 108. In a further example, there may be the SDP controller 108 in the third network 118 and an optional backup SDP controller 120 located in the second network 114 as a fallback option as shown in FIG. 1A.

The first device 102 may be a computing device and referred to as a client device executing a first client application outside of the SDP 106. The first device 102 may request access to a resource provided with the SDP 106 and implemented by the second device 104. The second device 104 may be the gateway or server located in the second network 114 different than the first network 110 and hosting one or more resources of interest for access by the first device 102. The first device 102 and the second device 104 may be behind one or more firewalls.

The SDP controller 108 may be a software module or a hardware module executing on a computing device. For requests from devices outside of the SDP 106, such as the first device 102 of FIGS. 1A and 1B, the SDP controller 108 may provide functionality for authenticating users and devices seeking to access resources within the SDP 106 before allowing connections between the devices across the SDP 106. The SDP controller 108 may receive data from the first device 102 for authentication and for use in encrypting communication data sent to the first device 102. For example, the SDP controller 108 may receive certificates, exchange public/private key data, and so on. The SDP controller 108 may maintain a secure list of clients allowed to access the second device 104 and/or resources on the second network 114.

In some embodiments, the SDP controller 108 provides functionality that allows two computing devices to establish a direct connection to each other, even though, in some embodiments, a first device 102 may be outside of the SDP 106 and may only have a public internet protocol (IP) address while the second device 104 is only accessible via a private IP address. As will be understood by those of ordinary skill in the art, although the methods and systems described herein may provide benefits in embodiments in which one or more of the networks across which computing devices seek to communicate implement network address translation (NAT), the methods and systems may be used as described even if NAT is not present (e.g., in an environment implementing IPv6).

Various embodiments may be executed as a client application and implemented as a software module or a hardware module, such as a module executed by the first device 102. The client application may include functionality for identifying and connecting to the SDP controller 108. The client application may include functionality for exchanging data such as packets with the SDP controller 108 and other devices. The client application may include an encryption module for implementing a public/private key encryption technique. The client application may include functionality for reaching out to and establishing a secure connection with the second device 104. The client application may include functionality for polling the SDP controller 108 to determine whether the SDP controller 108 has data identifying other client applications that may be available for communication with another computing device of the client application. The client application may include functionality for executing one or more Session Traversal Utilities for NAT (STUN) methods.

The first firewall 112 and the second firewall 116 may be a hardware component. Alternatively, the first firewall 112 and the second firewall 116 may be implemented as a software program executed by another device, such as a computing device (e.g., first device 102 and second device 104) or a network device such as a router. The firewall in the general sense, establishes a barrier between a trusted internal network and untrusted external network, and is a network security system that monitors and controls incoming and outgoing network traffic through ports. The ports in the firewalls may be opened or closed based on security protocols such as predetermined rules or a manual input by a user. A predetermined rule may be related to a list of approved applications or ports to allow access to such as a website. The configuration input by the user may include for example, configuring permissions for a program to access the internet by typing in a port number in a settings feature when prompted. The first firewall 112 and the second firewall 116 include functionality for creating, modifying, and deleting rules that dictate how to handle inbound packets.

Figure 2:
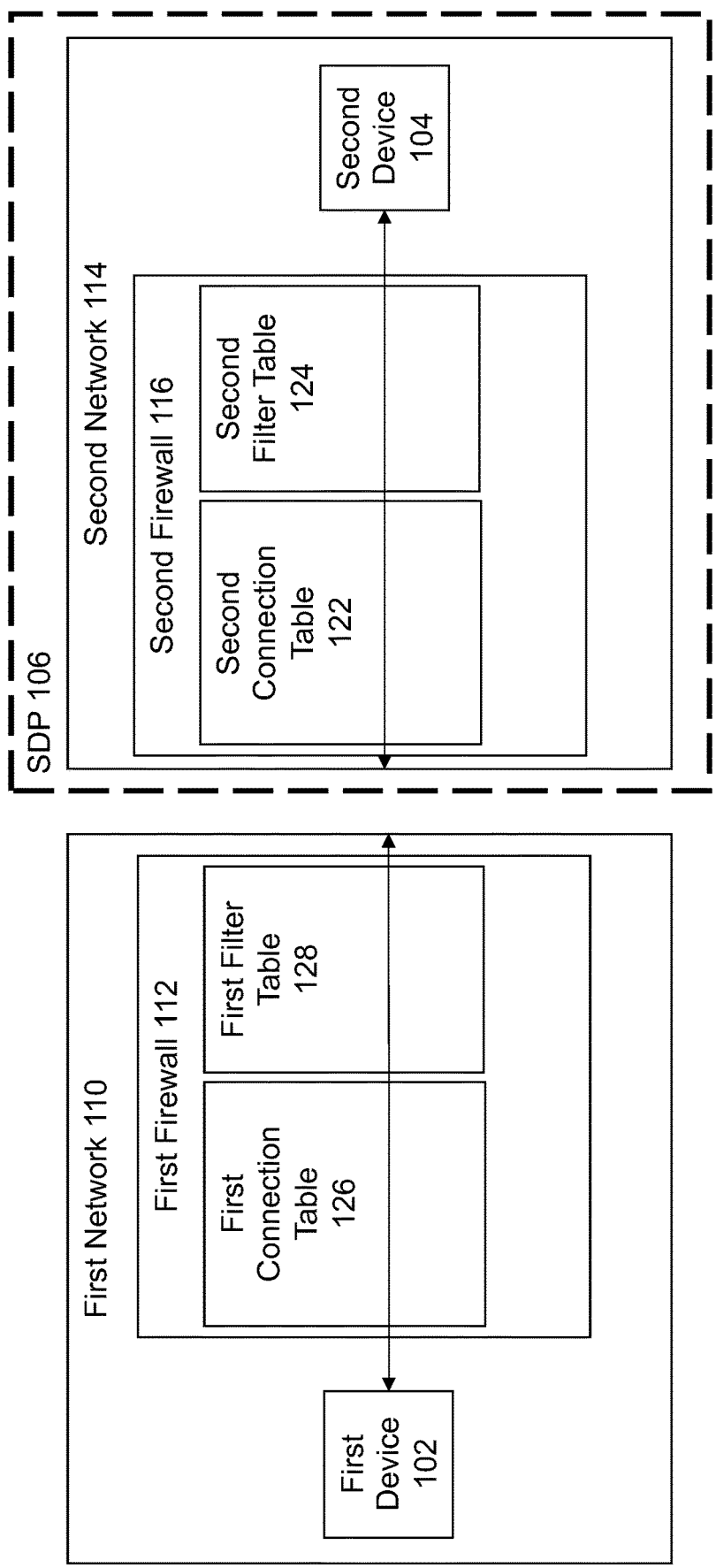
FIG. 2 is a simplified schematic of the first firewall and the second firewall within an example system, in accordance with some embodiments.

FIG. 2 is a simplified schematic of the first firewall 112 and the second firewall 116 within an example system, in accordance with some embodiments. The second firewall 116 in the second network 114 includes functionality for receiving a packet from a device outside the second network 114 such as the first device 102. The second firewall 116 includes a second firewall connection table 122. The second firewall connection table 122 is configured to map an identity of the first device 102 and an identity of the second device 104 for transmitting a plurality of packets between the first device 102 and the second device 104. The second firewall 116 includes a second firewall filter table 124 configured to open and close ports of the second firewall 116 based on user inputs for the identity of the first device 102 and the identity of the second device 104. As described herein, the ports may be opened or closed based on security protocols such as predetermined rules or a configuration input by a user so that incoming packets are allowed through the port or blocked from the port. The open port allows the packet to flow to the receiver while the closed port drops the packet.

In some embodiments, when a communication between the first device 102 and the second device 104, such as a packet, is received by the second firewall 116, the packet is first evaluated by the second firewall connection table 122 to determine if the identity of the first device—the sender—in association with the identity of the second device—the receiver—is mapped in the second firewall connection table 122 to indicate that the first device is enabled for communicating with the second device. When this is true or a match, in some embodiments, the packet is passed to the receiver. The implementation of the second firewall connection table 122 with a hole punching protocol (discussed hereafter) allows the packet to flow without configuring a port to be open.

Conversely, when the identity of the first device 102 and an identity of the second device 104 for transmitting a plurality of packets between the first device 102 and the second device 104 are not mapped in the second firewall connection table 122, the packet is passed to the second firewall filter table 124. The second firewall filter table 124 evaluates the packet and determines whether there is a port in the second firewall 116 already open. An open port allows the packet to pass through the second firewall 116.

The first firewall 112 in the first network 110 which is outside of the SDP 106, may also include a first firewall connection table 126 and a first firewall filter table 128. The operation and functionality of these components are similar to the description provided for the second firewall connection table 122 and the second firewall filter table 124.

Figure 3:
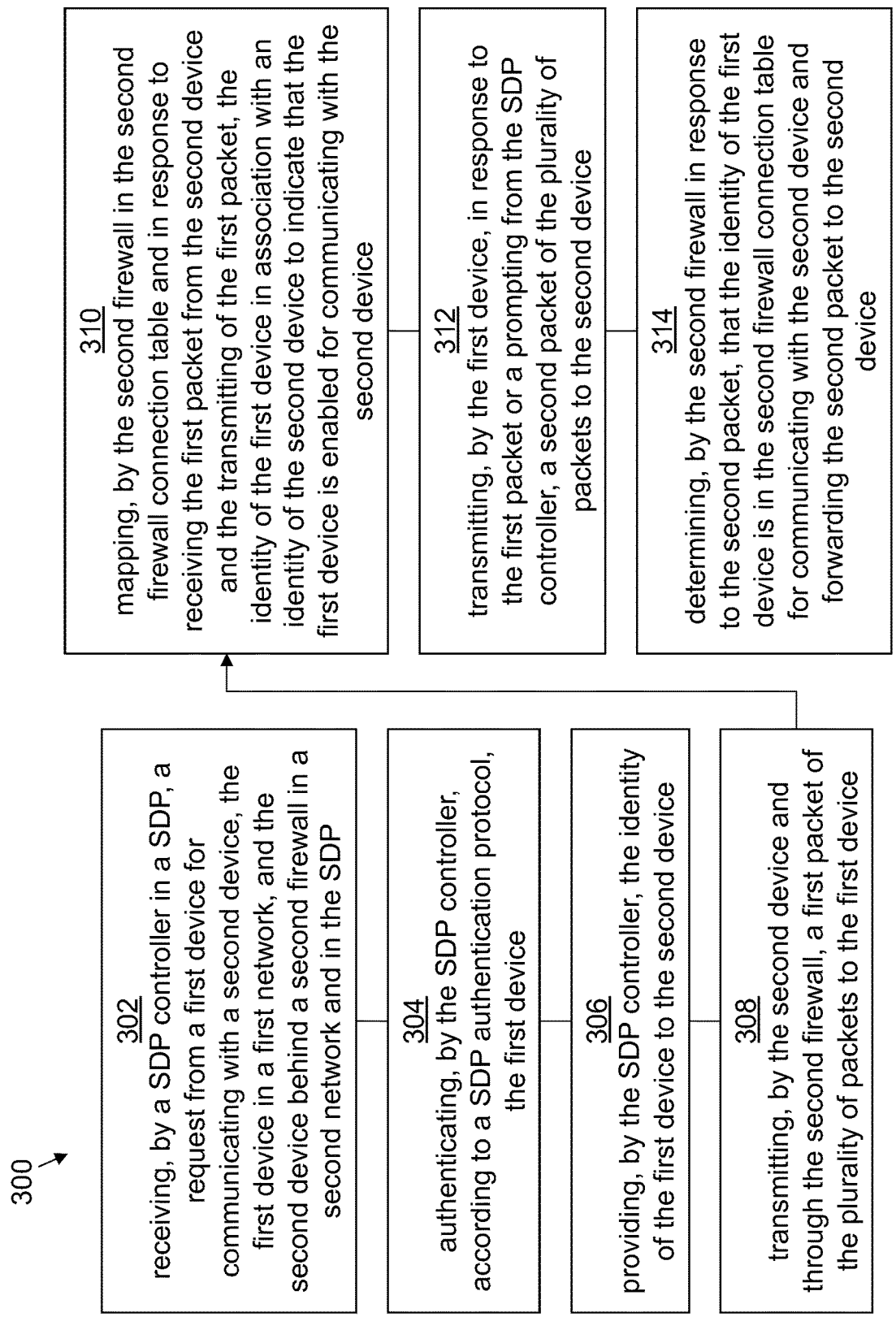
FIG. 3 is a flowchart of a method for establishing communication between the first device and the second device across the SDP, in accordance with some embodiments.

FIG. 3 is a flowchart of a method 300 for establishing communication between the first device 102 and the second device 104 across the SDP 106, in accordance with some embodiments. In this embodiment, the first device 102 is in a first network 110 and outside of the SDP 106 and the second device 104 is behind the second firewall 116, in the second network 114 and within the SDP 106.

At block 302, the SDP controller 108 within the SDP 106, receives a request from the first device 102 for communicating with the second device 104. The first device 102 is in the first network 110 and the second device 104 is behind the second firewall 116 in the second network 114 and in the SDP 106. The SDP controller 108 does not allow devices outside the SDP 106 to communicate with devices inside the SDP 106. As described, the second firewall 116 includes the second firewall connection table 122 configured to map an identity of the first device 102 and an identity of the second device 104 for transmitting a plurality of packets between the first device 102 and the second device 104. The second firewall filter table 124 is configured to open and close ports of the second firewall 116 based on user inputs for the identity of the first device 102 and the identity of the second device 104. In some embodiments, the packet is transmitted to the second firewall connection table 122 for evaluation before being transmitted to the second firewall filter table 124. The identities of the first device 102 and the second device 104 may be a public IP address, a private IP address or a port number.

The SDP 106 has a zero-trust security policy so that the perimeter protects from potential attacks by segmenting network access based on user permissions, authentication, and verification. Since the first device 102 is outside of the SDP 106, the first device 102 does not have access to applications within the SDP 106. At block 304, the SDP controller 108 authenticates the first device 102 according to a SDP authentication protocol. This may include verifying a certificate, exchanging public or private key data, or verifying the identity of the first device from a list of approved identities. In some embodiments, after the first device 102 is authenticated, the first device 102 may be considered to be part of the SDP. At block 306, after the first device 102 is authenticated, the SDP controller 108 provides the identity of the first device 102 to the second device 104.

At block 308, the second device 104 transmits a first packet of the plurality of packets through the second firewall 116 and to the first device 102. This may be an empty packet and may or may not be received by the first device 102. The intent of transmitting this packet is to cause the mapping of the first device 102 in association with the second device 104 in the second firewall connection table 122 in the second firewall 116. At block 310, in response to the second firewall 116 receiving the first packet from the second device 104 and transmitting the first packet to the first device 102, the second firewall connection table 122 maps the identity of the first device 102 in association with an identity of the second device 104 to indicate that the first device 102 is enabled for communicating with the second device 104. At block 312, in response to the first packet or a prompting from the SDP controller 108, the first device 102 transmits a second packet of the plurality of packets to the second device 104. At block 314, the second firewall 116 determines that the identity of the first device 102 is in the second firewall connection table 122 for communicating with the second device 104 and forwards the second packet to the second device 104. At this point, the method 300 establishes a secure connection for transmitting the plurality of packets directly between the first device 102 and the second device 104 while bypassing the second firewall filter table 124 in the second firewall 116 and without passing the plurality of packets through the intermediate broker or the SDP controller 108. For example, when block 314 is confirmed, the secure connection directly between the first device 102 and the second device is established without consulting the second firewall filter table 124. Therefore, no ports in the second firewall 116 need to be opened for communication. The method 300 results in the acquisition of the IP address and/or port number of the first device 102, or the identity of the first device 102, and provisioning of that identity to the second device 104 and thus mapping by the second firewall 116. In this way, with the secure connection established, when the first device 102 transmits data to the second device 104, the second firewall 116 allows that data to pass into the SDP 106 and the second network 114.

The mapping within the second firewall connection table 122 is maintained as a result of transmitting the plurality of packets between the first device 102 and the second device 104 and may expire after a period of time. The period of time may be a set duration such as seconds or minutes. For example, the state would be automatically dropped if not kept alive by normal traffic flow or keep-alive packets. This duration may be 5 seconds, 15 seconds, one minute, two minutes or up to four minutes.

Figure 4:
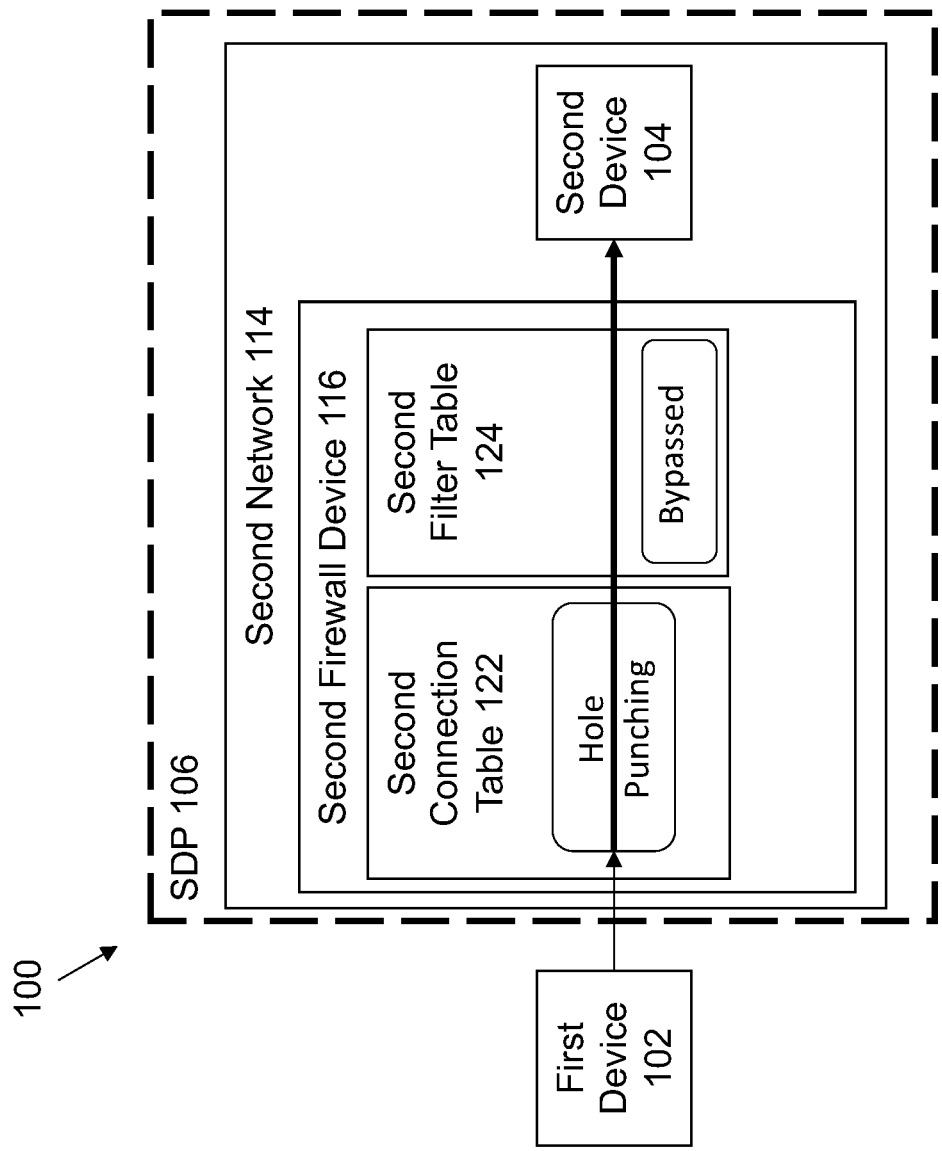
FIG. 4 depicts a simplified schematic of the method for establishing a secure connection between the first device and the second device across the SDP, in accordance with some embodiments.

FIG. 4 depicts a simplified schematic of the method 300 for establishing a secure connection between the first device 102 and the second device 104 across the SDP 106, in accordance with some embodiments. For example, following the steps of the method 300 by blocks 302-314, at block 314, the second firewall 116 determines that the identity of the first device 102 is in the second firewall connection table 122 for communicating with the second device 104. Once this is confirmed, the second packet is forwarded directly to the second device 104. Because the identities of the first device 102 and the second device 104 have been mapped in the second firewall connection table 122, the second firewall filter table 124 is bypassed. More importantly, the packet and any subsequent packets of the plurality of packets, do not pass through the SDP controller 108 or an intermediate broker due to the now direct, secure connection between the first device 102 and the second device 104.

Figure 5:
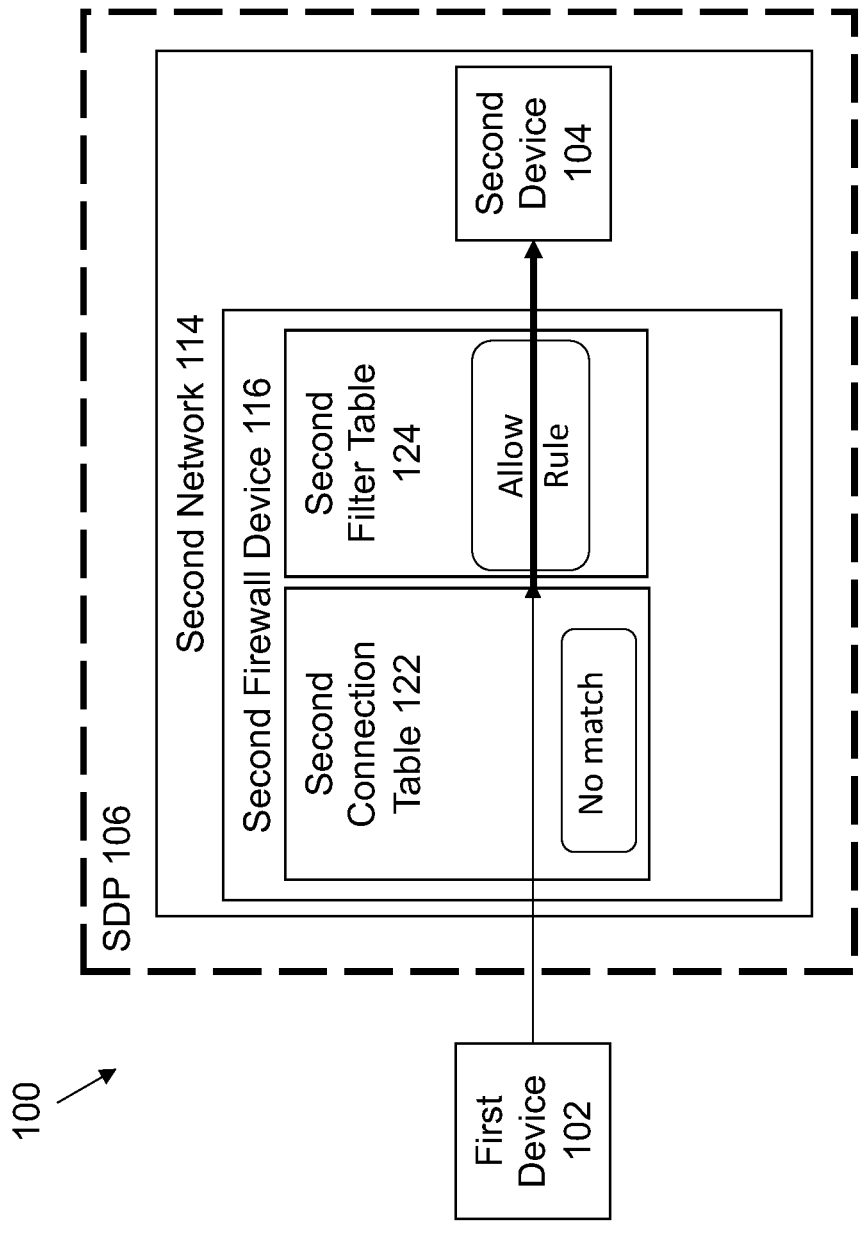
FIG. 5 depicts a simplified schematic of the method for establishing a secure connection between the first device and the second device across the SDP, in accordance with some embodiments.

FIG. 5 depicts a simplified schematic of the method 300 for establishing a secure connection between the first device 102 and the second device 104 across the SDP 106, in accordance with some embodiments. In this embodiment, at block 314, in response to the second packet, if the second firewall 116 determines that the identity of the first device 102 and the identity of the second device 104 are not mapped in the second firewall connection table 122—no match, the second firewall 116 forwards the second packet to the second firewall filter table 124 and the second firewall filter table 124 evaluates the second packet. Accordingly, an incoming packet is first evaluated by the second firewall connection table 122 and if there is no match, the packet is then evaluated by the second firewall filter table 124. The second firewall filter table 124 processes the second packet according to the set security protocol such as transmitting the second packet to the second device 104 based on rules and whether there is an open port to do so. When there is an open port in the second firewall 116, the second packet is transmitted through the open port. When there is a closed port in the second firewall 116, the second packet is denied transmission and the second packet may be dropped.

Figure 6:
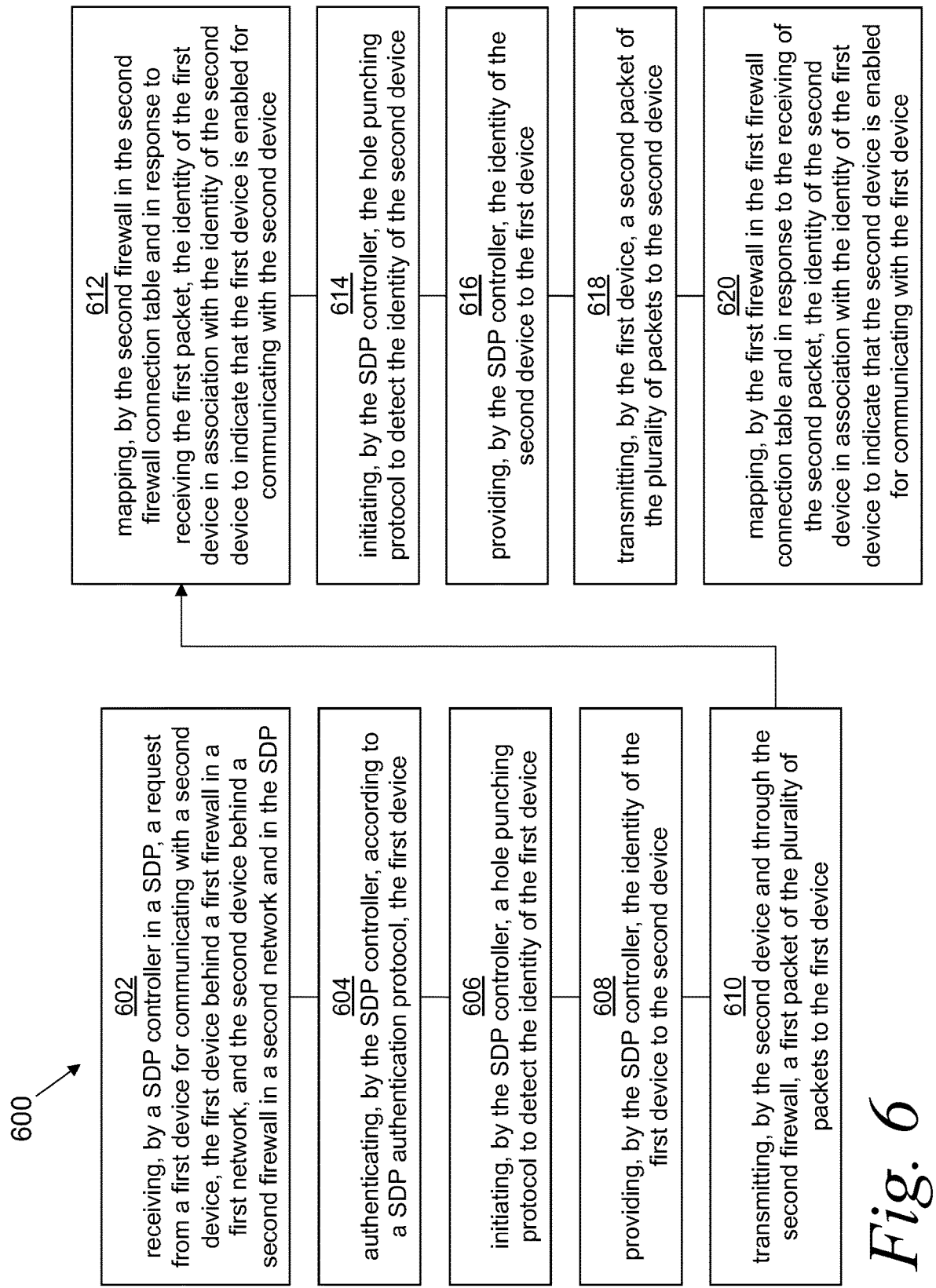
FIG. 6 is a flowchart of a method for establishing communication between the first device and the second device across the SDP, in accordance with some embodiments.

FIG. 6 is a flowchart of a method 600 for establishing communication between the first device 102 and the second device 104 across the SDP 106, in accordance with some embodiments. In this embodiment, the first device 102 is behind the first firewall 112 in the first network 110 and outside of the SDP 106, and the second device 104 is behind the second firewall 116, in the second network 114 and within the SDP 106. The SDP controller 108 does not allow devices outside the SDP 106 to communicate with devices inside the SDP 106.

At block 602, the SDP controller 108 within the SDP 106, receives a request from a first device 102 for communicating with a second device 104. The first firewall 112 includes the first firewall connection table 126 configured to map an identity of the first device 102 and an identity of the second device 104 for transmitting a plurality of packets between the first device 102 and the second device 104. The first firewall filter table 128 is configured to open and close ports of the first firewall 112 based on user inputs for the identity of the first device 102 and the identity of the second device 104. The second firewall 116 includes the second firewall connection table 122 configured to map an identity of the first device 102 and an identity of the second device 104 for transmitting a plurality of packets between the first device 102 and the second device 104. The second firewall filter table 124 is configured to open and close ports of the second firewall 116 based on user inputs for the identity of the first device 102 and the identity of the second device 104.

At block 604, the SDP controller 108 authenticates the first device 102 according to a SDP authentication protocol. As described, this may include verifying a certificate, exchanging public or private key data, or verifying the identity of the first device from a list of approved identities. In some embodiments, after the first device 102 is authenticated, the first device 102 may be considered to be part of the SDP 106. After the first device 102 is authenticated, at block 606, the SDP controller 108 initiates a hole punching protocol to detect the identity of the first device 102. In some embodiments, the first device 102 may automatically start the hole punching protocol once authenticated.

Hole punching is known in the art and a commonly used technique employed in NAT applications for maintaining packet streams that traverse the NAT, such as by User Datagram Protocol (UDP) or Transmission Control Protocol (TCP). Hole punching establishes bidirectional connections between hosts in private networks using network address translators. In some embodiments, hole punching identifies a public IP address and port number of the device. The SDP controller 108 facilitates the hole punching protocol and may direct an exchange of a sequence of messages using specific protocols to securely "punch a hole" in the first firewall 112 and/or the second firewall 116 to permit the first device 102 to gain access to the second device 104 and/or permit the second device 104 to gain access to the first device 102. The second device 104 may execute behind a NAT process, where the NAT is typically provided by the border firewall. Some embodiments of hole punching techniques are described in "Peer-to-Peer Communication Across Network Address Translators," by Ford et al., Feb. 17, 2005, which is in Appendix A and incorporated by reference in its entirety.

At block 608, the SDP controller 108 provides the identity of the first device 102 to the second device 104. The identity of the first device 102 may be a public IP address, a private IP address or a port number. At block 610, the second device 104 transmits a first packet of a plurality of packets through the second firewall 116 and to the first device 102. The first packet of the plurality of packets transmitted by the second device 104 to the first device 102 may or may not be received by the first device 102 depending on the security protocol of the first firewall 112. The transmission of the first packet causes the mapping of the second firewall connection table 122. At block 612, in response to receiving the first packet, the second firewall 116 maps in the second firewall connection table 122, the identity of the first device 102 in association with the identity of the second device 104 to indicate that the first device 102 is enabled for communicating with the second device 104.

Now that the hole punching protocol has been performed with regard to the second firewall 116, the hole punching protocol will be performed with regard to the first firewall 112. At block 614, the SDP controller 108 initiates the hole punching protocol to detect the identity of the second device 104. The identity of the second device 104 may be a public IP address, a private IP address or a port number. In some embodiments, the SDP controller 108 may already know the identity of the second device 104 since the second device 104 is located within the SDP 106. At block 616, the SDP controller 108 provides the identity of the second device 104 to the first device 102. At block 618, the first device 102 transmits a second packet to the second device 104. The second firewall 116 receives the second packet and in response to the second packet, determines or confirms that the identity of the first device 102 is in the second firewall connection table 122 for communicating with the second device 104 (see block 612). If so, the second firewall 116 forwards the second packet to the second device 104. At block 620, the first firewall 112, in response to receiving the second packet, maps in the first firewall connection table 126, the identity of the second device 104 in association with the identity of the first device 102 to indicate that the second device 104 is enabled for communicating with the first device 102. A secure connection is now established.

The method 600 establishes a secure connection for transmitting the plurality of packets directly between the first device 102 and the second device 104 while bypassing the first firewall filter table 128 in the first firewall 112 and the second firewall filter table 124 in the second firewall 116, and without passing the plurality of packets through the SDP controller 108 or an intermediate broker. This is accomplished with the implementation of the first firewall connection table 126 and the second firewall connection table 122 so that a direct connection is enabled between the first device 102 and the second device 104 without opening ports in either the first firewall 112 or the second firewall 116. This maintains the integrity of the zero-trust model of the SDP 106 while allowing access to applications within the SDP 106 without introducing latency, decreasing bandwidth or increasing the risk of malicious content entering the SDP 106.

The secure connection may include establishing an Internet Protocol Security (IPSec) connection or establishing a mutually-authenticated Transport Layer Security (TLS) tunnel. Once the secure connection is established, the plurality of packets are transmitted between the first device 102 and the second device 104 when the identity of the second device 104 is in the first firewall connection table 126 for communicating with the first device 102 and the identity of the first device 102 is in the second firewall connection table 122 for communicating with the second device 104. The mappings within the first firewall connection table 126 and the second firewall connection table 122 are maintained as a result of transmitting the plurality of packets between the first device 102 and the second device 104 and may expire after a period of time as described herein.

Figure 7:
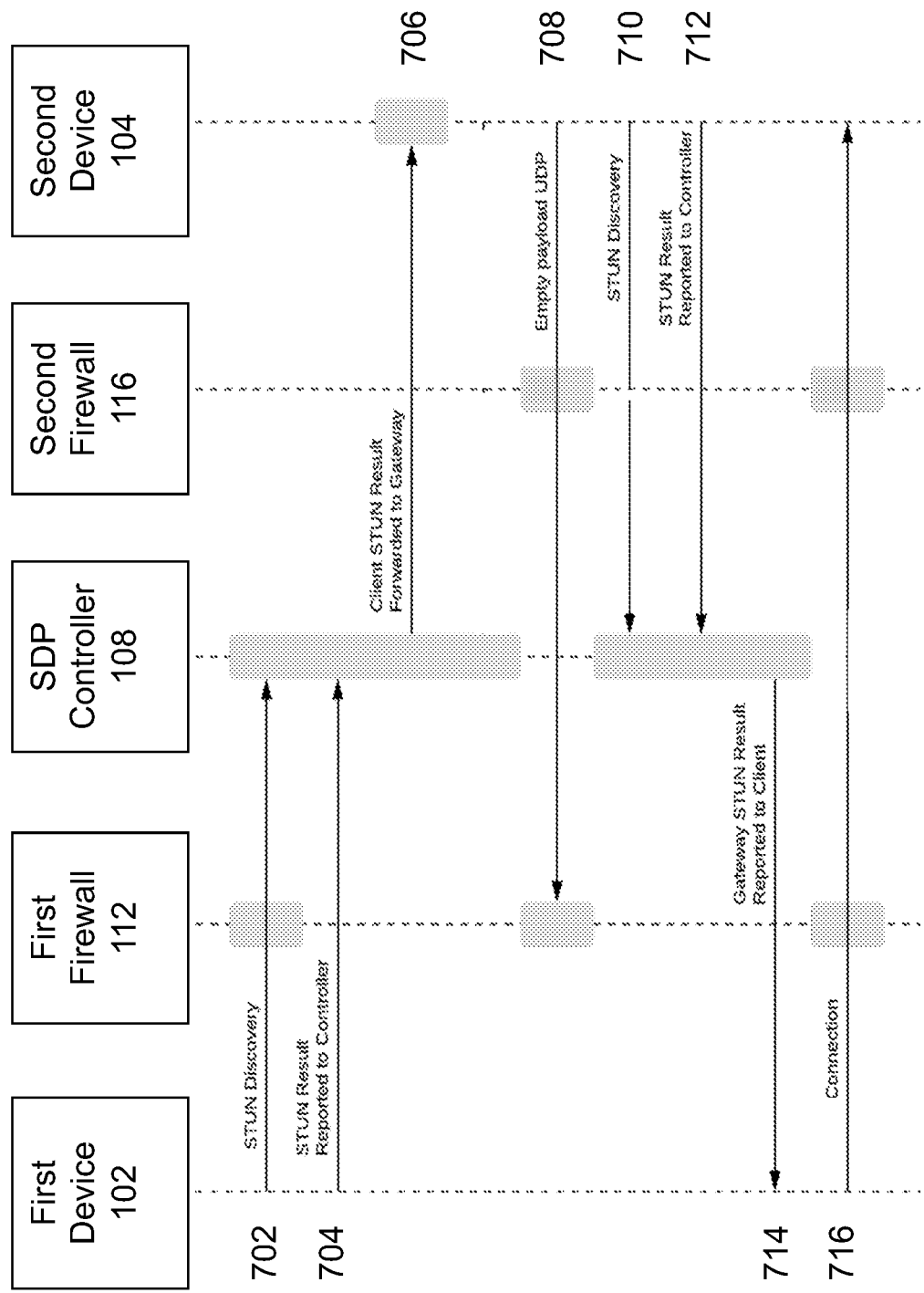
FIG. 7 is a block diagram of the communication flow for the method, in accordance with some embodiments.

FIG. 7 is a block diagram of the communication flow for the method 600, in accordance with some embodiments. In some embodiments, the system 100 includes functionality for implementing a STUN methodology to identify an IP address or port number assigned to the devices by the respective firewall in order to enable communication directly between at least two computing devices. In some embodiments, the devices in the system 100 communicate via Transmission Control Protocol (TCP), and in other embodiments, the devices in the system 100 communicate via the User Datagram Protocol (UDP), while in further embodiments, different protocols are used at different times. The systems described herein may provide functionality allowing for implementation of the methods regardless of whether the networks communicate via TCP or UDP. The first device 102 is behind the first firewall 112 in the first network 110, and the second device 104 is behind the second firewall 116 in the second network 114 and in the SDP 106. The SDP 106 also includes the SDP controller 108.

In some embodiments, a STUN discovery protocol may be used to identify the first device and the second device. A request according to the STUN discovery protocol may be received before receiving the request for establishment of the communications channel between the first device and the second device. Alternatively, the STUN discovery protocol request may be received as part of receiving the request for establishment of the communications channel between the first computing device and the second computing device. This is demonstrated as step 702.

At step 704, the STUN result of the first device 102 from the STUN discovery protocol is reported. The first device 102 is authenticated and begins a UDP conversation with the SDP controller 108. At step 706, the SDP controller 108 forwards the STUN result of the first device 102 to the second device 104 which may be the gateway in the second network 114. At step 708, the second device 104 (e.g. gateway) transmits though the second firewall 116 a first packet to the first device 102. This causes the second firewall 116 to map in the second firewall connection table 122 the identity of the first device 102 in association with the identity of the second device 104 to indicate that the first device 102 is enabled for communicating with the second device 104.

At step 710, the STUN discovery protocol is executed to discover the identity of the second device 104. At step 712, the STUN result of the second device 104 from the STUN discovery protocol is reported to the SDP controller 108. At step 714, the SDP controller 108 reports the STUN result of the second device 104 to the first device 102. At step 716, the first device 102 transmits a second packet to the second device 104. This causes the first firewall 112 to map in the first firewall connection table 126 the identity of the second device 104 in association with the identity of the first device 102 to indicate that the second device 104 is enabled for communicating with the first device 102. The secure connection is thus established directly between the first device 102 and the second device 104. Accordingly, the method 600 establishes the secure connection for transmitting the plurality of packets directly between the first device 102 and the second device 104 while bypassing the first firewall filter table 128 in the first firewall 112 and the second firewall filter table 124 in the second firewall 116, and without passing the plurality of packets through the SDP controller 108 or an intermediate broker. No ports have been opened in the first firewall 112 or the second firewall 116.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random-access memory. Storage devices suitable for tangibly embodying computer program instructions include, for example, all forms of computer-readable devices, firmware, programmable logic, or hardware.

A computer can generally also receive programs and data from a storage medium such as an internal disk or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Figure 8:
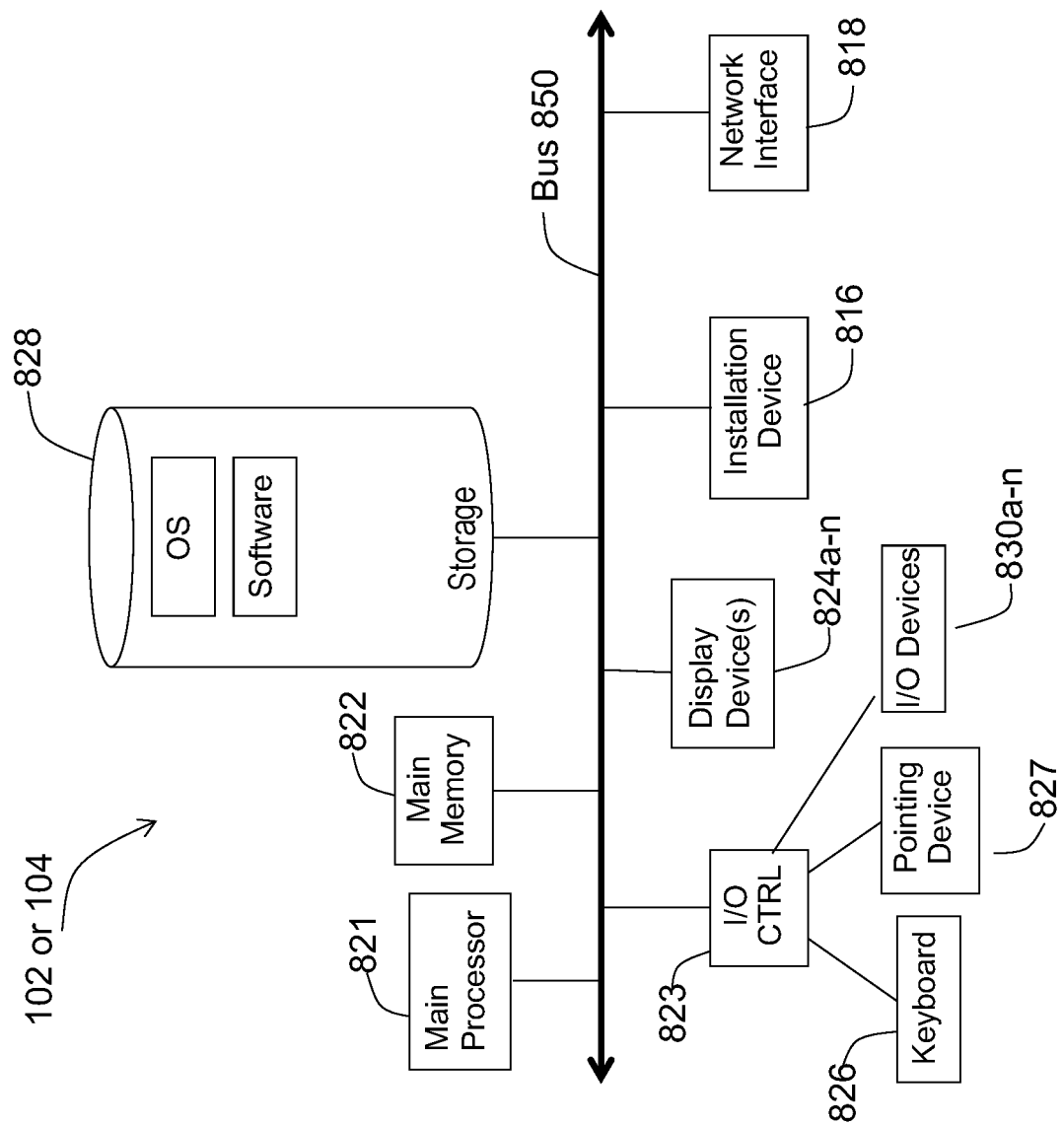
FIGS. 8 and 9 are schematic diagrams of the first device and the second device for implementing the methods and systems, in accordance with some embodiments.
Figure 9:
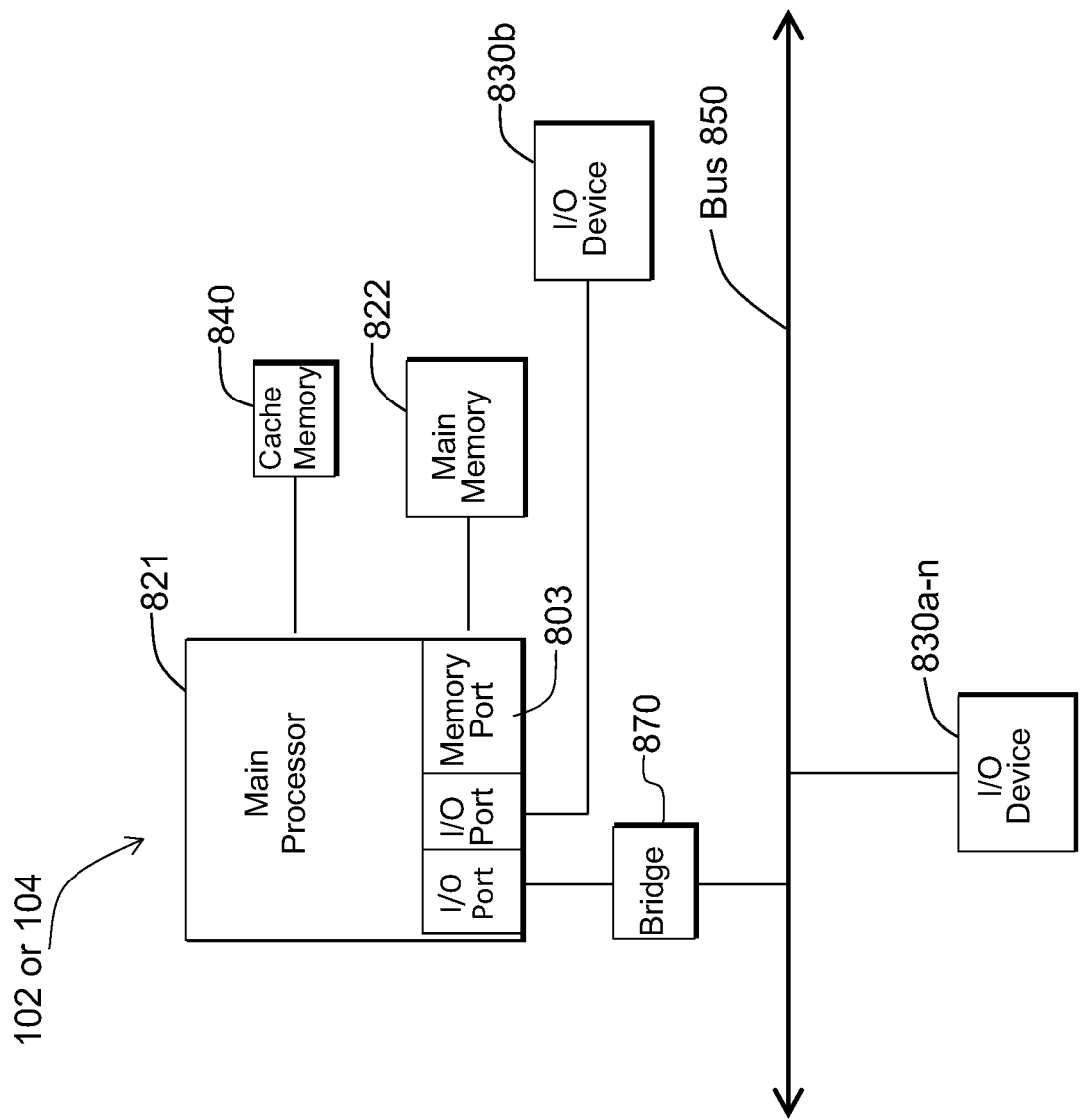

FIGS. 8 and 9 are example schematic diagrams of the first device 102 and the second device 104 for implementing the methods and systems, in accordance with some embodiments. The first device 102 and the second device 104 may include a central processing unit or main processor 821, main memory unit 822, storage device 828, an installation device 816, a network interface 818, an I/O controller 823, display devices 824a-n, a keyboard 826, a pointing device 827, such as a mouse, and one or more other I/O devices 830a-n. The storage device 828 may include, without limitation, an operating system and software. Referring to FIG. 9, the first device 102 and the second device 104 may also include additional optional elements, such as a memory port 803, a bridge 870, one or more I/O devices 830a-n (generally referred to using reference numeral 830), and a cache memory 840 in communication with the main processor 821.

The main processor 821 is any logic circuitry that responds to and processes instructions fetched from the main memory unit 822. In many embodiments, the main processor 821 is provided by one or more microprocessor units. Main memory unit 822 may be one or more memory chips capable of storing data and allowing any storage location to be directly accessed by the main processor 821. The main memory unit 822 may be based on any available memory chips capable of operating as described herein. In the embodiment shown in FIG. 8, the main processor 821 communicates with main memory unit 822 via a system bus 850 representing one or more communication subsystems internal to the first device 102 or the second device 104. FIG. 9 depicts an embodiment of the first device 102 and the second device 104 in which the processor communicates directly with main memory unit 822 via a memory port 803, and the main processor 821 communicates directly with cache memory 840 via a secondary bus, sometimes referred to as a backside bus. In other embodiments, the main processor 821 communicates with cache memory 840 using the system bus 850.

In the embodiment shown in FIG. 9, the main processor 821 communicates with various I/O devices 830 via the local system bus 850. Various buses may be used to connect the main processor 821 to any of the I/O devices 830. For embodiments in which the I/O device is a video display 824, the main processor 821 may use an Advanced Graphics Port (AGP) to communicate with the display 824. The main processor 821 also communicates directly with an I/O device 830b. One or more of a wide variety of I/O devices 830a-n may be present in or connected to the first device 102 or second device 104, each of which may be of the same or different type and/or form. Input devices include keyboards, mice, trackpads, trackballs, microphones, scanners, cameras, and drawing tablets. Output devices include video displays, speakers, inkjet printers, laser printers, 3D printers, and dye-sublimation printers. The I/O devices may be controlled by an I/O controller 823 as shown in FIG. 8. Furthermore, an I/O device may also provide storage and/or an installation device 816. In further embodiments, an I/O device 830 may be a bridge between the system bus 850 and an external communication bus.

In some embodiments, the first device 102 and second device 104 may provide functionality for installing software over the network, and may further comprise a storage device, such as one or more hard disk drives or redundant arrays of independent disks, for storing an operating system and other software. Alternatively, memory chips for storage may be used instead of hard disks.

Furthermore, the first device 102 and second device 104 may include a network interface 818 to interface to the network through a variety of connections including, but not limited to, standard telephone lines, LAN or WAN links, broadband connections, wireless connections, or some combination of any or all of the above. Connections can be established using a variety of communication protocols. In some embodiments, the first device 102 and second device 104 communicate with other devices via any type and/or form of gateway or tunneling protocol such as Secure Socket Layer (SSL) or Transport Layer Security (TLS). The network interface 818 may comprise a built-in network adapter, network interface card, PCMCIA network card, card bus network adapter, wireless network adapter, USB network adapter, modem, or any other device suitable for interfacing to any type of network capable of communication and performing the operations described herein.

The first device 102 and second device 104 typically operate under the control of operating systems, which control scheduling of tasks and access to system resources. The first device 102 and second device 104 can be running any operating system and may be can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the first device 102 and second device 104 may have different processors, operating systems, and input devices consistent with the device. In other embodiments, the first device 102 and second device 104 are a mobile device, such as a JAVA-enabled cellular telephone/smartphone, personal digital assistant (PDA), or tablet. In some embodiments, the first device 102 and second device 104 includes a combination of these devices.

The first device 102 and second device 104 may be a file server, application server, web server, proxy server, appliance, network appliance, gateway, application gateway, gateway server, virtualization server, deployment server, SSL VPN (Virtual Private Network) server, or firewall. In some embodiments, the first device 102 and second device 104 provide a remote authentication dial-in user service. In other embodiments, the first device 102 and second device 104 may have the capacity to function as either an application server or as a master application server. The first device 102 may be referred to as a client node, a client machine, an endpoint node, or an endpoint. In some embodiments, the client has the capacity to function as both a client node seeking access to resources provided by a server and as a server node providing access to hosted resources for other clients.

While the specification has been described in detail with respect to specific embodiments of the present invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the scope of the present invention, which is more particularly set forth in the appended claims.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:
receiving, by a software-defined perimeter (SDP) controller in a SDP, a request from a first device for communicating with a second device, the first device in a first network, and the second device behind a firewall in a second network and in the SDP, the SDP controller not allowing devices outside the SDP to communicate with devices inside the SDP, the firewall comprises:
a firewall connection table configured to map an identity of the first device and an identity of the second device for transmitting a plurality of packets between the first device and the second device; and
a firewall filter table configured to open and close ports of the firewall based on user inputs for the identity of the first device and the identity of the second device;
authenticating, by the SDP controller, according to a SDP authentication protocol, the first device;
providing, by the SDP controller, the identity of the first device to the second device;
transmitting, by the second device and through the firewall, a first packet of the plurality of packets to the first device;
mapping, by the firewall in the firewall connection table and in response to the transmitting of the first packet, the identity of the first device in association with the identity of the second device to indicate that the first device is enabled for communicating with the second device;
transmitting, by the first device, a second packet of the plurality of packets to the second device; and
determining, by the firewall in response to the second packet, that the identity of the first device is in the firewall connection table for communicating with the second device and forwarding the second packet to the second device;
wherein the method establishes a secure connection for transmitting the plurality of packets directly between the first device and the second device while bypassing the firewall filter table in the firewall and without passing the plurality of packets through an intermediate broker.

2. The method of claim 1, wherein the SDP authentication protocol includes verifying a certificate, exchanging public or private key data, or verifying the identity of the first device from a list of approved identities.

3. The method of claim 1, wherein the method establishes the secure connection for transmitting the plurality of packets directly between the first device and the second device while bypassing the firewall filter table in the firewall and without passing the plurality of packets through the SDP controller.

4. The method of claim 1, wherein the second device is a gateway.

5. The method of claim 1, wherein the mapping within the firewall connection table is maintained as a result of transmitting the plurality of packets between the first device and the second device.

6. The method of claim 1, wherein the mapping to the firewall connection table expires after a period of time.

7. The method of claim 1, further comprising the firewall filter table configured to open and close ports of the firewall based on rules.

8. The method of claim 1, further comprising when the second packet of the plurality of packets is received by the firewall, if the identity of the first device and the identity of the second device are not mapped in the firewall connection table, then the firewall filter table evaluates the second packet.

9. The method of claim 1, wherein a Session Traversal Utilities for Network Address Translation (STUN) discovery protocol is used to identify the first device and the second device.

10. The method of claim 1, wherein the identity of the first device and the identity of the second device includes an internet protocol (IP) address and a port number.

11. A method comprising:
receiving, by a software-defined perimeter (SDP) controller in a SDP, a request from a first device for communicating with a second device, the first device behind a first firewall in a first network, and the second device behind a second firewall in a second network and in the SDP, the SDP controller not allowing devices outside the SDP to communicate with devices inside the SDP, wherein:
the first firewall comprises:
a first firewall connection table configured to map an identity of the first device and an identity of the second device for transmitting a plurality of packets between the first device and the second device; and
a first firewall filter table configured to open and close ports of the first firewall based on user inputs for the identity of the first device and the identity of the second device; and the second firewall comprises:
a second firewall connection table configured to map the identity of the first device and the identity of the second device for transmitting the plurality of packets between the first device and the second device; and
a second firewall filter table configured to open and close ports of the second firewall based on user inputs of the identity of the first device and the identity of the second device;

authenticating, by the SDP controller, according to a SDP authentication protocol, the first device;

initiating, by the SDP controller, a hole punching protocol to detect the identity of the first device;

providing, by the SDP controller, the identity of the first device to the second device;

transmitting, by the second device and through the second firewall, a first packet of the plurality of packets to the first device;

mapping, by the second firewall in the second firewall connection table and in response to the receiving of the first packet, the identity of the first device in association with the identity of the second device to indicate that the first device is enabled for communicating with the second device;

initiating, by the SDP controller, the hole punching protocol to detect the identity of the second device;

providing, by the SDP controller, the identity of the second device to the first device;

transmitting, by the first device, a second packet of the plurality of packets to the second device; and mapping, by the first firewall in the first firewall connection table and in response to the transmitting of the second packet, the identity of the second device in association with the identity of the first device to indicate that the second device is enabled for communicating with the first device;

wherein the method establishes a secure connection for transmitting the plurality of packets directly between the first device and the second device while bypassing the first firewall filter table in the first firewall and the second firewall filter table in the second firewall, and without passing the plurality of packets through an intermediate broker.

12. The method of claim 11, wherein the SDP authentication protocol includes verifying a certificate, exchanging public or private key data, or verifying the identity of the first device from a list of approved identities.

13. The method of claim 11, wherein the first packet of the plurality of packets transmitted by the second device to the first device is not received by the first device.

14. The method of claim 11, wherein the secure connection is a mutually-authenticated Transport Layer Security (TLS) tunnel.

15. The method of claim 11, further comprising:
determining, by the second firewall in response to the second packet, that the identity of the first device is in the second firewall connection table for communicating with the second device and forwarding the second packet to the second device.

16. The method of claim 11, wherein the plurality of packets are transmitted between the first device and the second device only when the identity of the second device is in the first firewall connection table for communicating with the first device and the identity of the first device is in the second firewall connection table for communicating with the second device.

17. The method of claim 11, wherein a Session Traversal Utilities for Network Address Translation (STUN) discovery protocol is used to identify the first device and the second device.

18. The method of claim 11, wherein the method establishes the secure connection for transmitting the plurality of packets directly between the first device and the second device while bypassing the firewall filter table in the firewall and without passing the plurality of packets through the SDP controller.

19. The method of claim 11, wherein the mapping within the first firewall connection table and the second firewall connection table are maintained as a result of transmitting the plurality of packets between the first device and the second device.

20. The method of claim 11, wherein the mapping to the first firewall connection table and the second firewall connection table expire after a period of time.

* * * * *